United States Patent
Puzenat et al.

(10) Patent No.: US 9,517,682 B2
(45) Date of Patent: Dec. 13, 2016

(54) DEVICE AND METHOD FOR CONTROLLING AN ELECTRIC RADIATOR OF AN AUTOMOTIVE VENTILATING, HEATING AND/OR AIR-CONDITIONING SYSTEM

(75) Inventors: Bertrand Puzenat, Montigny le Bretonneux (FR); Stephane Souza, Velizy (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 623 days.

(21) Appl. No.: 13/883,891

(22) PCT Filed: Nov. 9, 2011

(86) PCT No.: PCT/EP2011/069709
§ 371 (c)(1),
(2), (4) Date: Jul. 16, 2013

(87) PCT Pub. No.: WO2012/062788
PCT Pub. Date: May 18, 2012

(65) Prior Publication Data
US 2013/0292372 A1 Nov. 7, 2013

(30) Foreign Application Priority Data

Nov. 9, 2010 (FR) ..................................... 10 04378
Nov. 9, 2011 (EP) ................... PCT/EP2011/069709

(51) Int. Cl.
*H05B 1/02* (2006.01)
*B60H 1/22* (2006.01)

(52) U.S. Cl.
CPC .......... *B60H 1/2218* (2013.01); *B60H 1/2225* (2013.01); *H05B 1/0236* (2013.01)

(58) Field of Classification Search
CPC ................................ H05B 1/02; H05B 1/0236
(Continued)

(56) References Cited

U.S. PATENT DOCUMENTS 6,040,561 A * 3/2000 Murty ................ B60H 1/00392
219/494
6,870,142 B2 * 3/2005 Hada ................... F02D 41/1494
219/494
2010/0296218 A1* 11/2010 Yen ........................... G06F 1/20
361/103

FOREIGN PATENT DOCUMENTS

DE 102008056757 A1 6/2009
EP 1932699 A1 6/2008
WO WO 2004/108446 A2 12/2004

OTHER PUBLICATIONS

English language abstract and translation for DE 102008056757 extracted from espacenet.com database on Sep. 19, 2013, 11 pages.
(Continued)

*Primary Examiner* — Brian Jennison
(74) *Attorney, Agent, or Firm* — Howard & Howard Attorneys PLLC

(57) ABSTRACT

The invention relates to a device for controlling a complementary electric radiator (R) installed in a ventilation system used in the automotive sector, said device including at least two electronic modules each including a computer, a control module (1) capable of sending operating commands to the radiator and a management module (2), which is implemented within the electric radiator (R) in order to manage the operation thereof on the basis of commands received from the control module (1). According to the invention, the control module (1) includes a unit for generating and transmitting a PWM signal representative of the operating commands being sent to the radiator (R) over a communication wire (3) connected to the management module (2) and a unit for reading the signal travelling over the communication wire (3); the management module (2) includes a unit for altering the PWM signal travelling over the communication
(Continued)

wire on the basis of detected events in the operation of the radiator (R).

14 Claims, 2 Drawing Sheets

(58) Field of Classification Search
USPC .......................................... 219/202, 490–494
See application file for complete search history.

(56) References Cited

OTHER PUBLICATIONS

English language abstract and translation for EP 1932699 extracted from espacenet.com database on Sep. 19, 2013, 4 pages.
International Search Report for Application No. PCT/EP2011/069709 dated Nov. 24, 2011, 5 pages.

\* cited by examiner

DEVICE AND METHOD FOR CONTROLLING AN ELECTRIC RADIATOR OF AN AUTOMOTIVE VENTILATING, HEATING AND/OR AIR-CONDITIONING SYSTEM

RELATED APPLICATIONS

This application is the National Stage of International Patent Application No. PCT/EP2011/069709, filed on Nov. 9, 2011, which claims priority to and all the advantages of French Patent Application No. FR 10/04378, filed on Nov. 9, 2010, the content of which is incorporated herein by reference.

BACKGROUND OF THE INVENTION

The present invention relates to the general field of the control devices of electric radiators installed in a ventilation, heating and/or air-conditioning system used in the automobile sector.

Such electric radiators are installed in the ventilation, heating and/or air-conditioning systems of the automobile sector to ensure the rapid heating of the passenger compartment at the start of operation of the vehicle with heat engine and before the heat from the engine itself ensures such heating. For an electric vehicle, such electric radiators ensure the main heating of the passenger compartment, in combination or not with a heat pump.

The invention applies to the general design of such electric radiators and the control thereof.

Conventionally, the electric radiator control device comprises at least two electronic modules each including a computer. A first module, called control module, is suitable for sending operating commands to the electric radiator and the second module, called management module, implemented within the electric radiator, is suitable for managing the operation of the electric radiator according to the commands received from the control module.

To control the electric radiator, it is therefore necessary for the control module to be able to send to a management module command signals to control the operation of the electric radiator. Typically, the control module sends to the computer of the management module of the electric radiator a required operating power.

In parallel, it is equally necessary, in an automobile ventilation, heating and/or air-conditioning system, for the electric radiator to be able to return to the control module diagnostic elements concerning its operation.

In particular, conventionally, the electric radiator may need to give feedback to the control module concerning the presence of any short-circuits, the presence of an electrical supply shortage or of an overvoltage on its power supply. It may also, advantageously, need to send information on the presence of an overheating condition or of an overshoot of a given temperature.

Currently, between the computers of such modules, it is known practice to use a bus of the LIN or CAN type which allows two-way communications between a plurality of computers. However, this is proving to be a costly solution. If no other use of the bus is envisaged, such a cost is not justified.

Other communication systems between two computers, used in such modules, use two communication wires, one from the control module to the management module and another from the management module to the control module. The two modules can thus dialog with one another.

The latter implementation entails installing two communication wires, which increases the complexity of the construction and adds to the cost compared to the installation of a one-way communication.

OBJECT AND SUMMARY OF THE INVENTION

The main aim of the present invention is therefore to mitigate the drawbacks of the existing two-way communication modes and, more particularly, to reduce the cost of implementation and ease of operation of the two-way communication mode by proposing that the control module comprises a unit for generating and transmitting a PWM signal representative of the operating commands to be sent to the radiator over a single communication wire linked to the management module and a unit for reading the signal circulating on the communication wire.

At the same time, the invention proposes that the management module itself comprise a unit for altering the PWM signal circulating on the single communication wire according to events detected in the operation of the radiator.

By proposing such a structure within the control and management modules themselves, the invention makes it possible to use a single communication wire on which circulates a PWM signal comprising two information items. This makes it possible to have an information item circulating in each of the two directions between the control module and the management module. In practice, the implementation of a unit for reading the PWM signal circulating on the communication wire in the control module makes it possible for the control module to be informed of an alteration of the PWM signal whose transmission over the communication wire it generates. The alteration is generated within the management module which comprises, for this purpose, elements enabling it to modify this signal in a different way for each of the events likely to be detected in the operation of the radiator.

By altering the PWM signal circulating on the communication wire differently according to these events, the management module ensures that it can communicate diagnostic information to the control module which, in an original manner, comprises a unit for reading the PWM signal circulating on the communication wire.

By reading the PWM signal present on the communication wire, the control module has access to the diagnostic information items that are introduced thereon by the management module.

According to an advantageous feature, the unit for altering the PWM signal, implemented in the management module, has a structure similar to the structure of the unit for generating the PWM signal.

Such an implementation of a structure comparable to the structure of the unit for generating the PWM signal is original according to the invention.

According to a preferential implementation feature, to signal a plurality of distinct events detected in the operation of the electric radiator, the unit for altering the signal uses an alteration frequency below a frequency value equal to the fraction of the frequency on which the operation of the unit for generating the PWM signal of the control module is aligned.

By proposing to use a lower frequency to implement the alteration, the invention makes it possible for the unit for generating the PWM signal and the unit for generating the signal for altering the PWM signal to work simultaneously on the same communication wire.

The use of two distinct frequencies allows for the possibility of the different readings of the PWM signal in the control module and the management module.

Advantageously, the alteration unit uses distinct duty cycles for each type of event to be signaled.

This feature ensures a clear reading of the PWM signal altered by the control module with a reading unit of the type of that usually implemented within the management module.

Typically, the reading unit of the control module will see the arrival of a PWM signal truncated over a certain number of periods of the PWM signal as generated within the unit for generating the PWM signal of the control module, and will interpret the signal truncated over a certain number of periods according to the number of truncation periods in order to know the meaning of the alteration of the PWM signal.

Advantageously, the fractions are between ½ and ⅕.

Such fractions make it possible for the PWM signal to remain legible frequently enough for the reading unit implemented within the management module. This ensures that the operation of the electric radiator is not compromised by the two-way communication. Such a division of the operating frequency of the unit for generating the PWM signal allows for the coding of five types of events detected in the operation of the electric radiator, which represents a correct number suited to the application.

In practice, such a number of fractions, ½, ⅓, ¼, ⅕, already makes it possible to code four events, which is generally sufficient to provide diagnostic feedback from the electric radiator to the control module.

According to a particular feature, the unit for generating a PWM signal implemented in the control module and/or the unit for altering the PWM signal implemented in the management module has at least one overcurrent protection unit.

The presence of such an overcurrent protection unit is relatively conventional inasmuch as a unit for generating a PWM signal is used within an electronic circuit. This avoids in particular having overcurrents compromise the operation of the transistors implemented in the generation or, according to the invention, alteration units.

Advantageously, the management module also comprises a unit for reactivating and deactivating the management module according to the PWM signal received.

The presence of such a unit for reactivating and deactivating the management module is useful only within the management module since there is always, according to the invention, a master-slave relationship between the control module and the management module. The structure of the control device according to the invention requires the management module to operate only when ordered by the control module, the reverse not being true.

Thus, it is useful for the management module to comprise means for the reception of a non-zero PWM signal to reactivate the management module and, conversely, deactivate it in the absence of the reception of a PWM signal from the control module. This makes it possible to save energy.

The invention also relates to a method for controlling an electric radiator installed in a ventilation, heating and/or air-conditioning system used in the automobile sector, this method comprising a step of sending, via a control module, operating commands to the electric radiator, and a step of managing the operation of the electric radiator, via a management module implemented within this radiator, according to the commands received from the control module.

According to the invention, the control method also comprises:

within the control module, a step of generation of a PWM signal representative of the operating commands to be sent to the radiator, a step of transmission of the PWM signal, by the control module, over a communication wire linked to the management module, a step of reading, by the control module, the signal circulating on the communication wire, within the management module, a step of reading the PWM signal circulating on the communication wire, a step of generation of an alteration signal to alter the PWM signal according to, and in case of, events detected in the operation of the radiator, a step of application of the alteration to the PWM signal circulating on the communication wire.

With such a method, the invention ensures the presence of a two-way communication between the control module and the management module on one and the same communication wire physically implemented between the management module and the control module.

BRIEF DESCRIPTION OF THE DRAWINGS

Other features and advantages of the present invention will become apparent from the description given below, with reference to the appended drawings which illustrate an exemplary embodiment thereof that is in no way limiting. In the figures.

DETAILED DESCRIPTION OF AN EMBODIMENT

Figure 1:
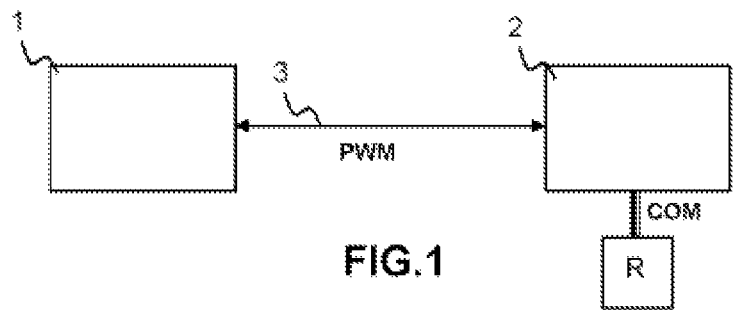
FIG. 1 schematically shows the structure of a control device of a complementary radiator according to the invention.

FIG. 1 schematically represents the structure of a control device of an electric radiator R according to the invention. The control device is made up of a control module 1 linked to a management module 2, which is in turn linked to the electric radiator R so as to send command signals COM to it. The control module 1 and the management module 2 are linked by a single communication wire 3, on which circulates a PWM signal.

Figure 2:
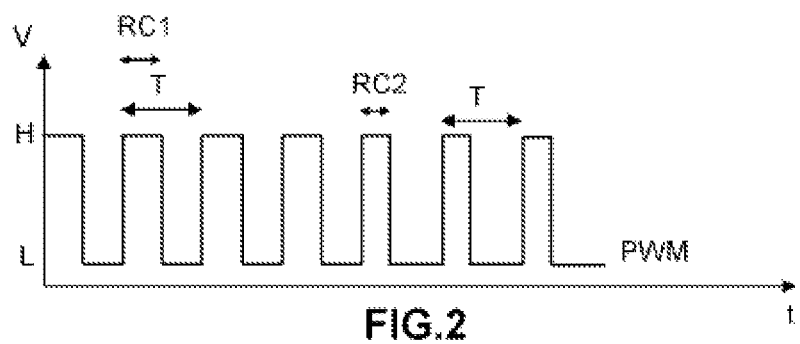
FIG. 2 shows a time diagram of a PWM signal comprising a command transmitted by a control module according to the invention to the complementary radiator according to the invention.

The structure of such a PWM signal is shown in FIG. 2 which represents a time diagram of a voltage V as a function of time t. It can be seen, in this figure, that the PWM signal is a periodic signal of constant period T. For example, the frequency of the PWM signal will be 150 Hz.

During a period T, the PWM signal alternates between a high level, denoted H, and a low level, denoted L. The features of this alternation enable the control module 1 to inform the management module 2 of the operating setpoints COM to be communicated to the complementary electric radiator R.

Thus, in the case of the control of an electric radiator, the required operating power is communicated by the control module 1 using the duty cycle RC of the PWM signal, this duty cycle being defined as being the duration of the high state H over the period of the PWM signal.

Thus, the variation of the duty cycle within the PWM signal, for example from RC1 to RC2 as illustrated in FIG. 2, can be used to express the power value required for the operation of the radiator R. For example, the duty cycle of the PWM signal will vary between 5 and 95%, this percentage being correlated to a variation from 0 to 100% of the maximum heating power.

Various operating conventions can thus be used. For example, a duty cycle of 5% will correspond to 100% of the maximum power commanded from the radiator R and a duty cycle of 95% will correspond to a zero power commanded from the radiator.

In practice, the increase or the reduction of the duty cycle and, therefore, of the operating power of the radiator is progressive and passes through intermediate states before reaching the setpoint power.

In parallel with this communication of a required power, the control device according to the invention provides for it to be possible, for the management module 2 of the electric radiator R, to signal the detection of particular events in the operation of the electric radiator R.

The invention proposes to use the PWM signal itself to therefore give diagnostic feedback on the operation of the radiator R. Thus, a certain number of defects will be able to be signaled to the control module 1 through different alterations of the PWM signal as present on the communication wire 3.

In one illustrative embodiment, three types of defect, defect 1, defect 2 and defect 3, will be able to be signaled. For example, "defect 1" corresponds to a short-circuit or to an open circuit on one or more heating circuits. "Defect 2" corresponds to an undervoltage or to an overvoltage of the radiator R. Finally, "defect 3" corresponds advantageously to an excessive temperature.

Each of these defects has an associated zeroing of the PWM signal, commanded by the management module 2. These zeroings take place for time periods that are dependent on the observed defect. The zeroing of the PWM signal corresponds to the low state L of the signal.

Advantageously, the management module 2 uses a modification of the duty cycle of the signal within a frequency that is less than a fraction of the frequency of the PWM signal as generated by the control module 1.

This fraction is of at least the number of types of events to be indicated incremented by 1, therefore 4 here.

The period of the alteration will therefore be at least equal to 4 times the period of the PWM signal generated by the control module 1.

FIG. 3 shows an example of indication of an event. In this figure, an alteration signal ALT is shown. This alteration signal ALT has an alteration period TD. This period TD corresponds to five periods T of the PWM signal generated by the control module 1.

Thus, defect 1 will, for example, be associated with a zeroing for a duration equal to a quarter of the alteration period, denoted TD. Defect 2 will, for example, be associated with a zeroing for a duration equal to half the alteration period TD. Defect 3 will, for example, be associated with a zeroing for a duration equal to a third of the alteration period TD.

Figure 3A:
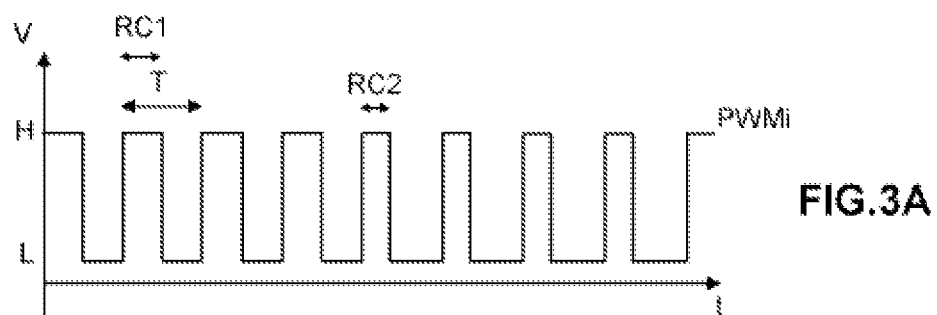
FIGS. 3A, 3B and 3C show three time diagrams respectively of a PWM signal as produced by the control module, of a signal for altering the PWM signal introduced by the complementary radiator and of the resultant signal circulating between the control module and the complementary radiator.

FIG. 3 represents the signaling of the defect 2 by a zeroing of the PWM signal over half of the alteration period TD. For example, the alteration period lasts a second. The signaling of the defect lasts, within the PWM signal, until the defect concerned disappears. The signaling of this defect does not hamper the interpretation of the PWM signal by the reading unit within the management module 2 since, between two zeroings of the PWM signal, the duty cycle of the PWM signal as generated by the control module 1 remains perfectly legible. FIG. 3A reproduces the PWMi signal as commanded on the communication wire 3 by the control module 1.

Figure 3B:
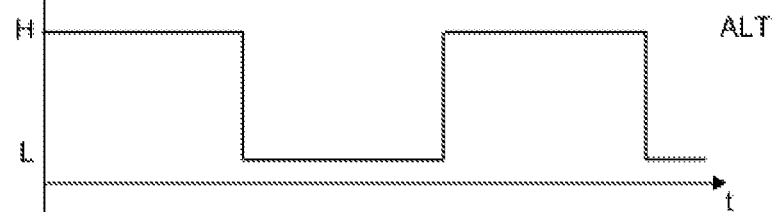

FIG. 3B represents the alteration signal applied to the communication wire 3 by the management module 2.

Figure 3C:
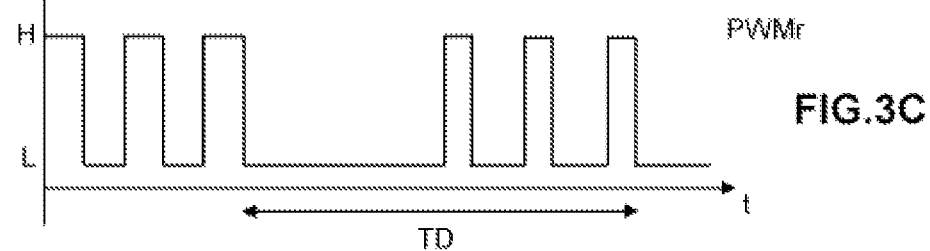

FIG. 3C represents the PWMr signal, the result of the application of the preceding two signals, represented in FIGS. 3A and 3B, to the communication wire 3. This PWMr signal is read at both ends of the communication wire 3 by the control module 1 and the management module 2. Each of these modules is then capable of interpreting the signal is according to the information that it is looking for therein.

The control module 1 will fetch the information that it has not applied to the communication wire 3, namely the zeroing over a plurality of periods of the PWM signal that it has transmitted over the communication wire 3. It will then interpret this as a signaling of a particular event and will consider this to be a diagnostic item concerning the operation of the electric radiator R.

For its part, the management module 2 will find, on the communication wire 3, the information items that it has not applied, namely the duty cycle of the PWM signal outside of the time bands over which this signal is zeroed by itself. The management module 2 will then interpret the PWMr signal as signifying the command for a given power as a function of the duty cycle observed on the portions of the PWMr signal that are not zeroed.

Figure 4:
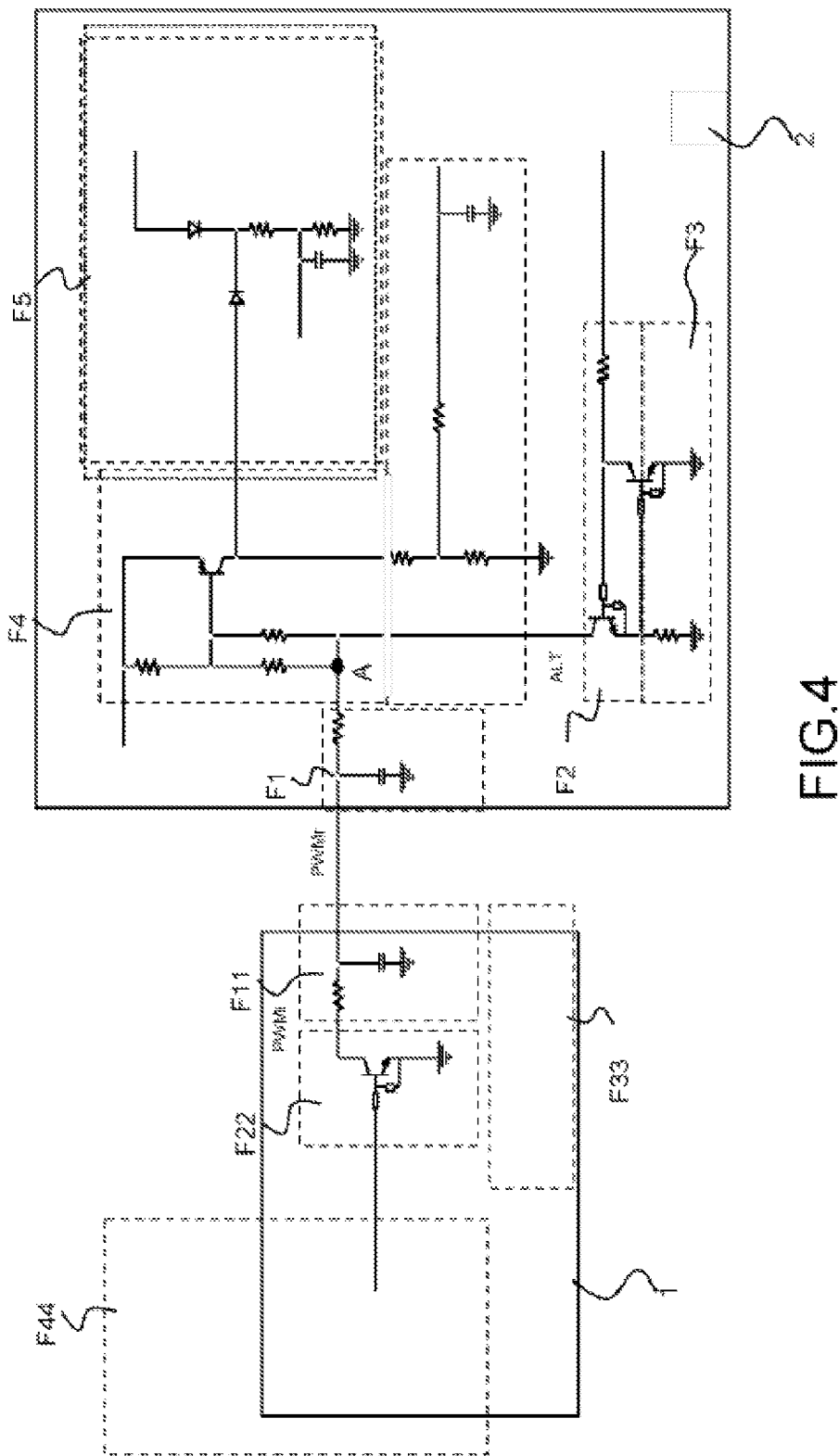
FIG. 4 shows the internal electronic structures of the control module and of the complementary radiator according to the invention.

FIG. 4 schematically represents the elements required for the two-way communication according to the invention between the control module 1 and the management module 2, using one and the same single PWM signal.

This figure shows a certain number of functional units that make it possible to implement the invention. Thus, conventionally, the control module 1 comprises a unit for generating the PWM signal and transmitting this signal, denoted F22. In this unit F22, the transmission of the PWM signal and its generation are performed using the transistor Q4.

Preferentially, the control module 1 also comprises a protection unit F11 protecting the interface on the communication wire 3. This protection unit F11 makes it possible to protect the unit F22 for generating and transmitting the PWM signal from electrostatic discharges and electromagnetic stresses.

Advantageously, a protection unit F33 for the transistor group Q4 protecting against the short-circuits to the positive terminal of the battery is also present within the control module 1. This protection unit F33 is not detailed in FIG. 4 but is similar to the protection unit F3 described within the management module 2.

Within a conventional management module of the prior art, the management module comprises a reception unit F4, advantageously protected by a protection unit F1 protecting the interface against electrostatic discharges and electromagnetic stresses.

The reception unit F4 is preferentially also linked to a reactivation and deactivation unit F5. The reactivation and deactivation unit F5 is used to start up the operation of the reception unit F4 when a PWM signal is received on the communication wire 3. This reactivation and deactivation unit F5 is useful also for shutting down the reception unit F4 when the electric radiator R is off in the absence of any PWM signal on the communication wire 3.

The operation of a one-way communication on a communication wire 3 using a PWM signal is such that a point denoted A and corresponding to the input into the reception unit F4 is only linked to the resistors R2 and R12 of the reception unit F4.

According to the invention, to allow for the implementation of the two-way communication, this point A is linked to a unit F2 for generating an alteration of the PWM signal on the communication wire 3. This alteration unit F2 is original according to the invention. It comprises a transistor Q1, the operation of which by opening and closing enables the management module 2 to alter the PWM signal in a meaningful manner for the control module 1.

Thus, in the case where the transistor Q1 is open, within the management module 2 of the electric radiator R, the management module 2 behaves like a management module of the prior art, and a one-way communication is then only possible.

According to the invention, in the case where the management module 2, for diagnostic purposes, has to send information to the control module 1, the transistor Q1 is used by closure, over a portion of a quite particular alteration period TD. The closure of the transistor Q1 alters the PWM signal in such a way that the resultant PWMr signal, circulating on the communication wire 3, can also be interpreted by the control module 1 to know the state of the electric radiator R.

Thus, according to the invention, the closure of the transistor Q1 brings the PWM signal to the low state, thus ensuring a possibility of sending information from the management module 2 to the control module 1.

The activation frequency of the transistor Q1 must practically be substantially less than the activation frequency of the transistor Q4 of the control module 1.

Also, to be able to interpret the PWMr signal circulating on the communication wire 3, the control module 1 must comprise a reading unit, denoted F44, comprising elements similar to those present in the reception unit F4. This original reading unit enables the control module 1 to know the PWMr signal as it is actually circulating on the communication wire 3 and not only to know the signal that it has itself generated on the communication wire 3.

Advantageously, the alteration unit F2 is protected in a way similar to the unit F22 for generating the PWM signal by a protection unit F3 protecting against short-circuits to the positive terminal of the battery. According to the structure of the protection unit F3, a transistor Q2 protects the transistor Q1 in the event of a short-circuit from the communication wire 3 to the positive terminal of the battery. In practice, in this case, a high current intensity circulating in the resistor R7 results in the closure of the transistor Q1 under the action of the transistor Q2. This protects the transistor Q1.

The presence of the reactivation and deactivation unit F5 is necessary to ensure a low-consumption mode for the electric radiator R, when there is no activity on the communication wire 3. In practice, an absence of low state on the communication line 3 implies, within the functional reading block F4, that a transistor Q3 is always open.

This implies that a capacitor C4, present in the reactivation and deactivation unit F5, is not charged through KL15. Advantageously, there is software within the management module 2 to make it possible to decide to zero the PWM signal, using the action of the transistor Q1.

In the case where the PWM signal has then been zeroed, there is no longer a way of charging the transistor Q4 by any means. Thus, the capacitor C4 completes a full discharge. The voltage, denoted REG_EN, at the terminals of the capacitor is then at a low level. Thus, no energy consumption takes place in the management module 2 and in the complementary electric radiator R.

In order to be able to reactivate the management module 2 with an activity on the communication line 3, the charging time constant of the capacitor C4 is much lower than the discharging time constant of the capacitor C4. Thus, a low duty cycle can reactivate the management module 2. In practice, a low state on the communication line results in the charging of the capacitor C4.

Then, advantageously, software implemented within the management module 2 ensures the reactivation state by charging the capacitor C4 through another pathway by which the capacitor C4 is powered by a microprocessor present within the management module 2.

In FIG. 4, a power supply PWM-EN that is independent and controlled by the microprocessor is then used.

Finally, it should be noted that various implementations can be produced according to the principles of the invention.

The invention claimed is:

1. A device for controlling a complementary electric radiator installed in a ventilation system used in the automobile sector, the device comprising at least two electronic modules each including a computer, wherein a first electronic module is a control module suitable for sending operating commands to the radiator and a second electronic module is a management module which is disposed within the radiator and manages operation of the radiator according to the commands received from the control module, wherein the control module comprises a unit for generating and transmitting a PWM signal representative of the operating commands to be sent to the radiator over a single communication wire linked to the management module and a unit for reading the signal circulating on the single communication wire, and the management module comprises a unit for altering the PWM signal circulating on the single communication wire according to diagnostic feedback from the operation of the radiator, and the PWM signal is transmitted back and forth between the control module and the management module across the single communication wire.

2. The device as claimed in claim 1, wherein the unit for altering the PWM signal implemented in the management module has a structure similar to the structure of the unit for generating the PWM signal such that the unit for altering the PWM signal and the unit for generating the PWM signal are each directly coupled to individual protection units, and wherein the individual protection units protect the unit for altering the PWM signal and the unit for generating the PMW signal from electrostatic discharges and electromagnetic stresses.

3. The device as claimed in claim 1, wherein the diagnostic feedback from the operation of the radiator includes a plurality of types of distinct events detected in the operation of the radiator, and the unit for altering the signal uses an alteration frequency below a frequency value equal to the fraction of the frequency on which the operation of the unit for generating the PWM signal of the control module is aligned.

4. The device as claimed in claim 3, wherein the alteration unit uses distinct duty cycles for each type of distinct event to be signaled.

5. The device as claimed in claim 3, wherein the fractions are between $1/2$ and $1/5$.

6. The device as claimed in claim 3, wherein the unit for generating a PWM signal implemented in the control module and/or the unit for altering the PWM signal implemented in the management module has/have at least one overcurrent protection unit.

7. The device as claimed in claim 3, wherein the management module also comprises a unit for reactivating and deactivating the management module according to the PWM signal received.

8. A method for controlling a complementary electric radiator installed in a ventilation system used in the automobile sector, the method comprising a step of sending, via a control module, operating commands to the radiator and a step of managing the operation of the radiator, via a management module disposed within this radiator, according to the commands received from the control module, wherein the control method also comprises:

within the control module, generating a PWM signal PWMi representative of the operating commands to be sent to the radiator, transmitting the PWM signal, by the control module, over a single communication wire linked to the management module, reading, by the control module, the signal PWMr circulating on the single communication wire, within the management module, reading the signal PWMr circulating on the single communication wire, generating an alteration signal ALT to alter the PWM signal according to, and in case of, events detected in the operation of the radiator, and applying the alteration ALT to the PWM signal circulating on the single communication wire.

9. The device as claimed in claim 2, wherein, the diagnostic feedback from the operation of the radiator includes a plurality of types of distinct events detected in the operation of the radiator, and the unit for altering the signal uses an alteration frequency below a frequency value equal to the fraction of the frequency on which the operation of the unit for generating the PWM signal of the control module is aligned.

10. The device as claimed in claim 9, wherein the alteration unit uses distinct duty cycles for each type of distinct event to be signaled.

11. The device as claimed in claim 10, wherein the fractions are between ½ and ⅕.

12. The device as claimed in claim 9, wherein the unit for generating a PWM signal implemented in the control module and/or the unit for altering the PWM signal implemented in the management module has/have at least one overcurrent protection unit.

13. The device as claimed in claim 9, wherein the management module also comprises a unit for reactivating and deactivating the management module according to the PWM signal received.

14. The device as claimed in claim 1, wherein the PMW signal is representative of at least two operating commands, and each of the at least two operating commands are circulating in opposite directions between the control module and the management module.

* * * * *